3,395,283
TOOL-SETTING GAUGES USING PHOTOELECTRIC CELLS FOR CONTROLLING THE TOOL POSITION
Harry Ernest Alfred Sefton, Basingstoke, and Lawrence Brennan, Newbury, England, assignors to United Kingdom Atomic Energy Authority, London, England
Filed Oct. 1, 1965, Ser. No. 492,096
Claims priority, application Great Britain, Oct. 8, 1964, 41,055/64
6 Claims. (Cl. 250—210)

This invention relates to tool-setting gauges and relates particularly to gauges for setting the initial or datum position of a cutting tool on a machine-tool e.g. a numerically controlled lathe, in which the subsequent movements of the cutting tool are performed automatically in accordance with a preset programme fed to the machine-tool on punched tape, or a copying lathe.

In such arrangements, it is most important that initially the spatial position of the cutting tool, in relation to the workpiece, should correspond exactly with the datum position from which the programme has been arranged to start; moreover the cutting tool has to be set to this position prior to operating on each successive workpiece. One existing method of performing this setting on a copying lathe has been to position two plane orthogonal surfaces at known distances from the spindle axis and spindle flange respectively, and then, by means of contacting dial indicators registering on the cutting edge of the tool, to position the tool at set distances from both these surfaces.

Numerically controlled lathes are now available in which the incremental movements of the cutting tool in response to the programme are as small as $20 \times 10^{-6}$ inch. In order to make full use of the potential machining accuracy attainable with such machines, it is clearly essential that the datum position should be set with comparable accuracy. The setting method described above is unsatisfactory in this respect from three aspects:

(1) The cutting-tool edge is ground to precise dimensions of size and profile, e.g. to an exact radius. Thus, to avoid damage to the cutting edge and to the profile, ideally there should be no physical contact with the edge during the setting operation. Contact with a hard-surfaced dial indicator has been found to produce "flats" on the edge.
(2) It has been found that, using dial indicators, no two operators can repeat the same setting to better than $\pm 50 \times 10^{-6}$ inch of a nominal figure. A single operator will produce a similar spread in his own settings.
(3) Especially where the lathe is enclosed in a glovebox for machining toxic materials, the dial method of setting is slow and difficult to perform.

It is an object of the present invention to provide improved means for performing the datum setting.

According to the present invention a tool-setting gauge comprises means rigidly mountable on a machine-tool frame for projecting an enlarged shadow of a cutting-tool edge profile on to at least one photoelectric means, said photoelectric means presenting a photosensitive area sufficiently small to be intersectable by only a short length of said enlarged edge profile and being positionable, when partially obscured by the shadow of said profile, to define a datum position of said profile, and means for displaying the output of said photoelectric means relative to a preset output corresponding to the datum position.

Said photoelectric means may comprise at least two photoelectric elements positionable to define the datum position in two orthogonal directions.

Preferably the means for displaying the outputs of said photoelectric elements relative to a preset output includes a further photoelectric element associated with each said element but positioned to be unobscured in operation by said shadow, each pair of associated elements being connected in a bridge circuit presettable to give a predetermined output in the datum position of the profile.

Preferably the means for projecting the enlarged shadow includes a light source and means for modulating the light source, the output from said bridge circuit being fed to an AC amplifier. The modulating means preferably comprises a rotatable disc having its circumference divided by radial slot arranged to interrupt the light from said source.

The photoelectric elements are preferably photosensitive semiconductor devices.

To enable the nature of the present invention to be more readily understood, attention is directed, by way of example, to the accompanying drawings wherein FIGURE 1 is a perspective view of a gauge embodying the invention mounted on the frame of a Bendix-Excello copying lathe.

Figure 1:
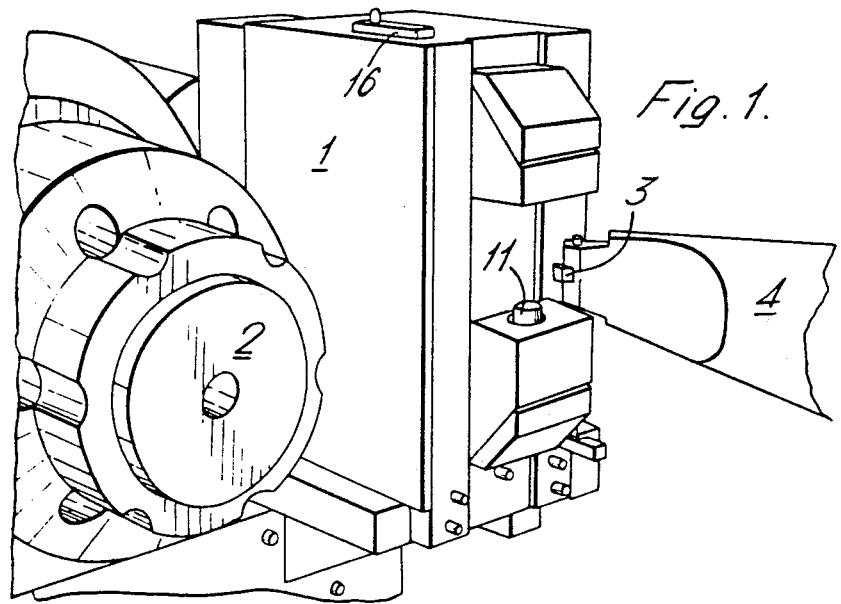

FIGURE 1 shows a gauge 1 mounted rigidly on the spindle-slide of a Bendix-Excello copying lathe having a chuck 2. A cutting tool 3 is mounted at one end of an arm 4 which is fastened to a post (not shown). The post can be moved longitudinally and transversely, relative to the chuck axis, in response to the machining programme. The tool is shown near its datum position prior to the start of a programme.

Figure 2:
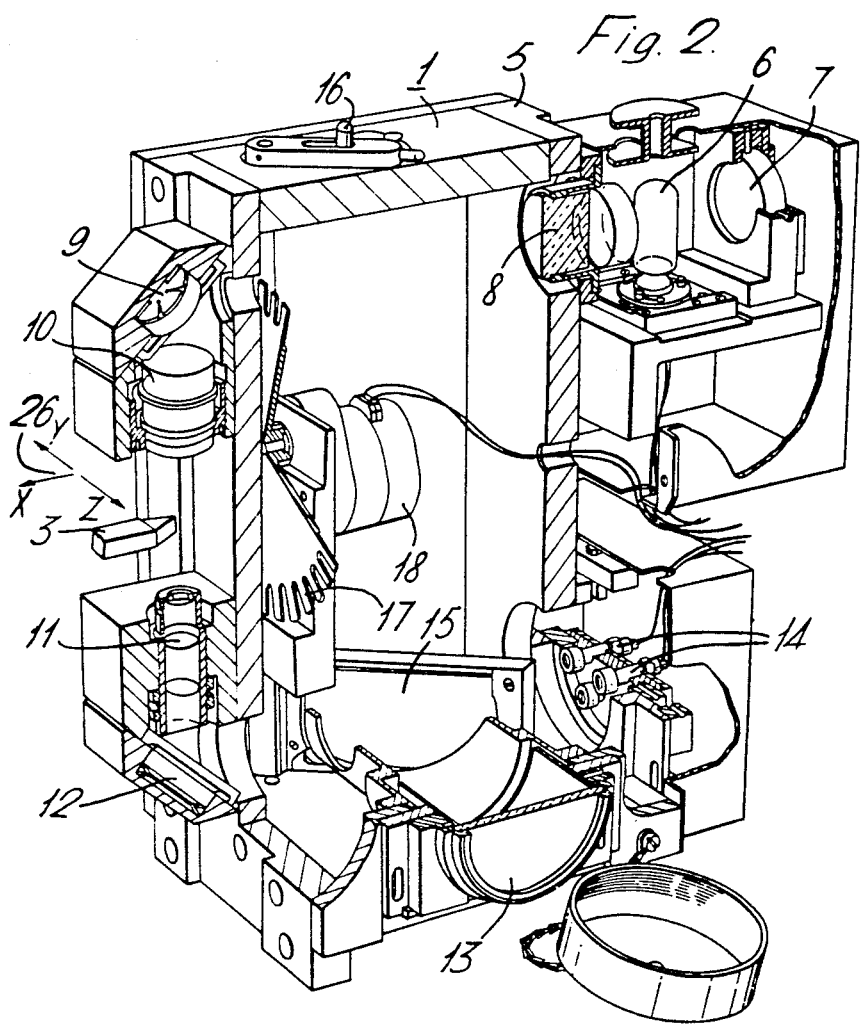
FIGURE 2 is a perspective view of the gauge of FIGURE 1 cut away to show the internal construction.

FIGURE 2 shows the gauge 1 from the opposite side to FIGURE 1, the arm 4 and chuck 2 being omitted for clarity. Rigidly mounted within a container 5 are a light source 6 backed by a concave mirror 7 and followed by a condensing lens 8, a plain mirror 9 and an $f$ 1.9, 1½ inch focal length converging lens 10 which provides maximum illumination of the profile of the cutting edge of tool 3. The shadow of this profile is projected by an $f$ 2.5, ½ inch focal length, inverted telephoto lens 11, via a plain mirror 12, to give a ×16 enlarged image on either a ground-glass screen 13 or an array of six photo-diodes 14 (of which only three are shown), depending on the position of a reflex mirror 15 operated by a lever 16. Located in the focal plane of the condenser lens 8 is a disc 17 driven by an electric motor 18. The circumference of disc 16 contains 50 slots, and acts as a chopper which modulates the light illuminating the tool at a frequency of 133.9 c./s.

Figure 3:
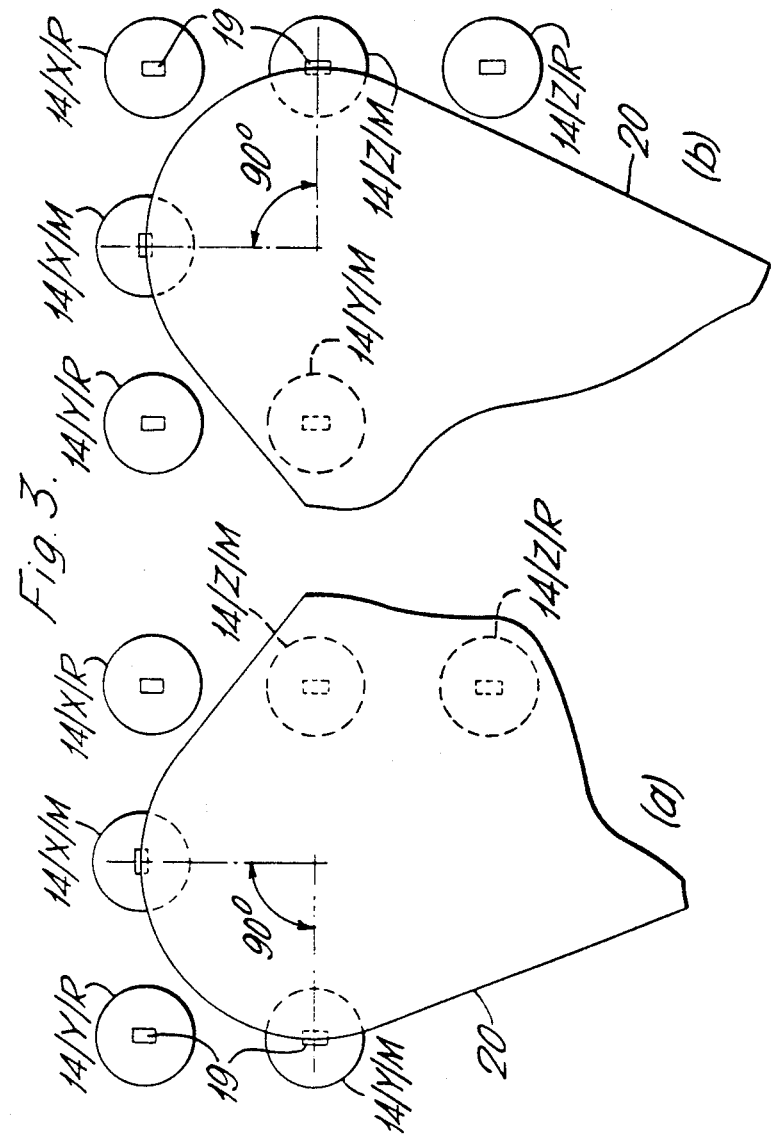
FIGURE 3 shows on an enlarged scale the layout of the photo-diodes used in the gauge of FIGURE 1.

FIGURE 3 shows in more detail the array of six photo-diodes 14 and is drawn approximately to scale. The present embodiment is for use with tools having profiles which are semi-circular in form, and the array comprises three photo-sensitive semiconductor measuring diodes 14/X/M, 14/Y/M and 14/Z/M equispaced on a circumference whose radius is equal to (tool profile radius × magnification). The diodes are ST and C germanium junction photo-diodes Type PG 50A, having a light-sensitive area, indicated by the rectangles 19, of about 0.02 inch x 0.06 inch. It is arranged that, in the datum position of the tool, the shadow 20 of the tool edge profile intersects and partially covers the relatively small sensitive areas either of diodes 14/Y/M and 14/X/M, when a tool is oriented for internal cutting of a workpiece (FIGURE 3(a)), or of diodes 14/X/M and 14/Z/M, when a tool is oriented for external cutting of a workpiece (FIGURE 3(b)). Change of tool orientation as between internal and external cutting is necessary because the chuck rotates in one direction only. Referring to the arrows 26 in FIGURE 2 which indicate the directions in which the tool can be moved, diode 14/Y/M is used to define the position of its profile in the Y direction, diode 14/X/M in the X direction, and diode 14/Z/M in the Z direction.

Figure 4:
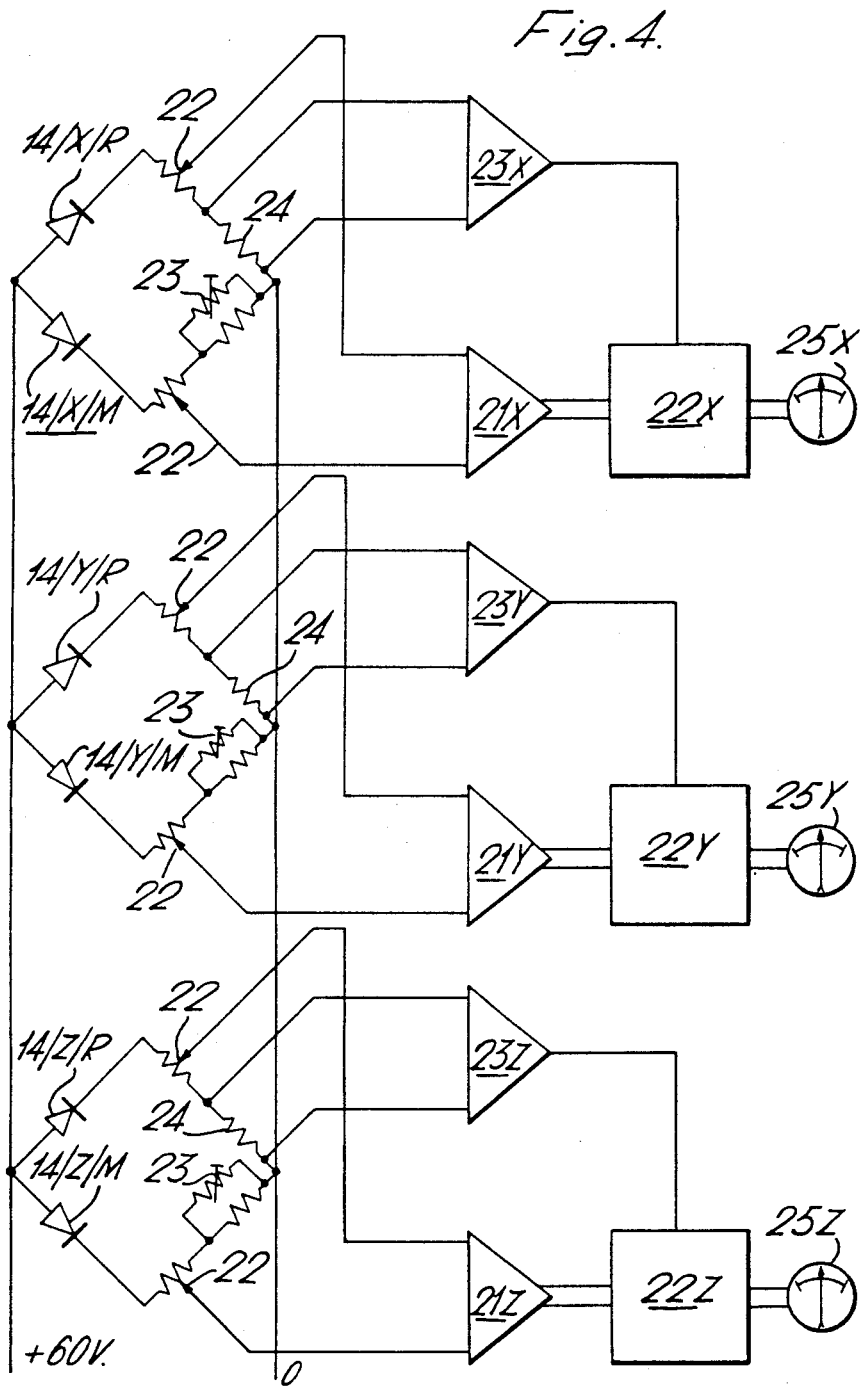
FIGURE 4 is a schematic diagram of the electronic circuits used with the gauge of FIGURE 1.

Associated with each of the three diodes 14/X/M to 14/Z/M are reference diodes 14/X/R to 14/Z/R respectively of the same type, whose sensitive areas are unobscured by shadow 20 in the particular datum position, for either internal or external cutting, which the relevant pair of measuring diodes is serving to define. Each measuring diode and its associated reference diode are connected together in a bridge circuit (FIGURE 4), the outputs across which are taken to balanced input AC amplifiers 21X, 21Y and 21Z respectively. The output tappings 22 on each bridge are adjustable, together with the parallel trimming resistor 23, so that in the datum position, the signal arising from the unobscured portion of the sensitive area 19 of each measuring diode can be made to balance exactly the signal arising from its associated reference diode to give zero output from the bridge. The amplifiers are followed by phase-sensitive rectifiers 22X, 22Y and 22Z respectively, whose reference voltages are derived from balanced-input amplifiers 23X, 23Y and 23Z respectively, the inputs to which are taken across a resistor 24 in series with the reference diode in each bridge. The DC outputs from the phase-sensitive rectifiers are displayed on centre-zero meters 25X, 25Y and 25Z respectively.

One method of setting-up the present gauge is to first set the tool to the approximate datum position by the dial gauge method already described. A trial cut is then made on a workpiece, from subsequent measurements on which the error in the approximate setting can be determined. The necessary correction in the datum position is then made manually by noting the number of unit incremental movements of the tool which are required. (The lathe control unit includes a digital display of the number of unit incremental movements made by the tool, which facilitates this adjustment.) The tool being now in the correct datum position, the present gauge is fitted to the lathe, and the bridge controls adjusted, for either internal or external cutting as appropriate, to give zero reading on both of the appropriate meters 25. The gauge is now ready for use.

To reposition the tool in the datum position after machining each workpiece, the following procedure is used.
(a) The reflex mirror is i.&BVi-
(a) The reflex mirror 15 is positioned so that the shadow of the tool profile is displayed on screen 13. By manipulating the machine control, the tool is so located that visual coincidence is obtained between a circular grating marked on the screen and the projected shadow. In this condition the tool will be within about 0.001 inch of its correct datum position.
(b) The mirror 15 is moved so that the projected shadow falls on the photo-diodes 14. Final adjustment of the machine controls is then made until zero readings are obtained on the two meters 25 corresponding to the type of tool (for internal or external cutting) being set.

To achieve the maximum accuracy and constancy of operation, each pair of measuring and reference diodes is selected to have closely matched characteristics. The null method of operation used ensures that any non-linearity of these characteristics does not affect the accuracy of the setting. To eliminate inaccuracies due to variations in illumination, it has been found desirable to under-run the 7.5 w. lamp 6 at 2.5 v, and 2.8 a, to achieve a more uniform output with respect to time, and a regulated AC supply is used. Stabilised DC supplies are used for the AC amplifiers and the diode bridges. The use of modulated light and AC amplification enables the wanted current variations due to movement of shadow 20 to be readily separated from DC variations in diode current due to stray light and to temperature variations.

Figure 5:
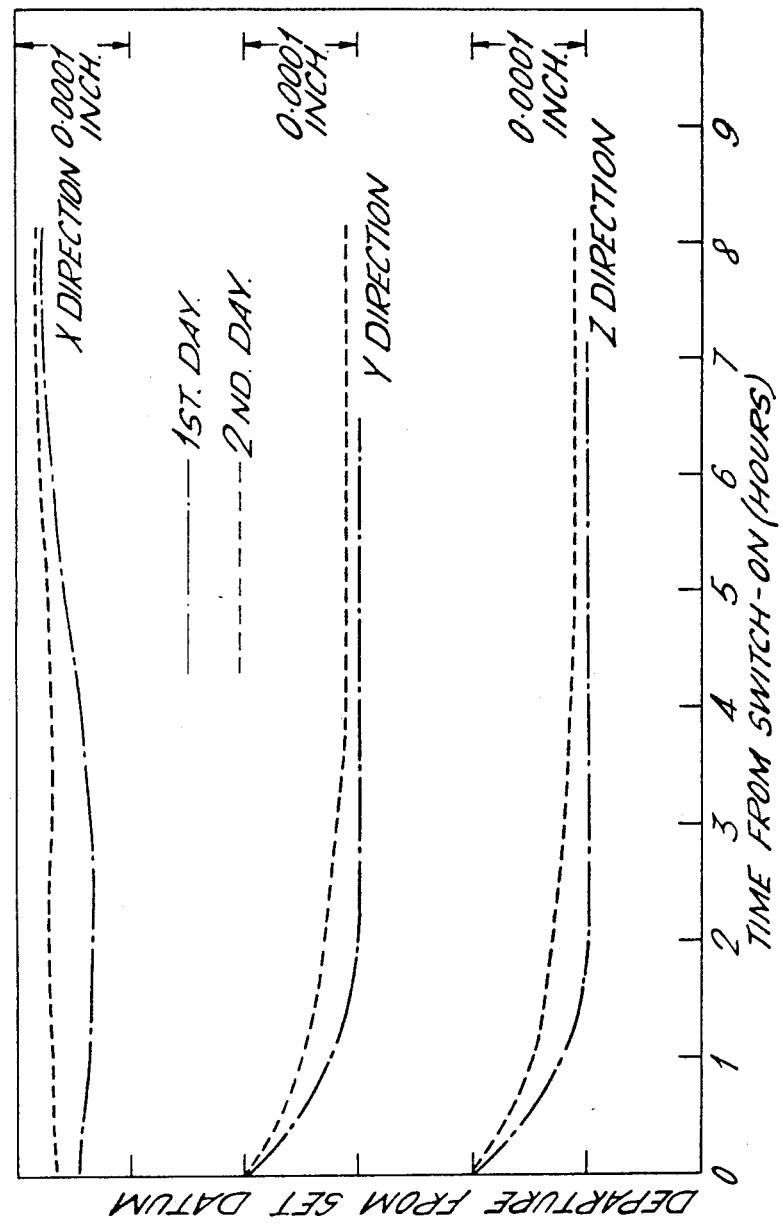
FIGURE 5 is a graph showing the stability in setting accuracy attainable over a period of time with the present embodiment.

FIGURE 5 shows the long-term stability obtainable in terms of the variation from a set datum, the measurements being made with a Moore Universal Measuring Machine. It will be seen that after steady operating conditions have been reached, the datum position can be reset at any time on two successive days to within about $\pm 10 \times 10^{-6}$ inch. After only one hour from switch-on, a datum setting will be within about $45 \times 10^{-6}$ inch of any subsequent setting. It may be noted that the Excello lathe itself normally takes about an hour to reach a stable operating condition after switch-on.

Although described with reference to cutting tools having semicircular profiles, the present invention can be used to define the datum positions of tools having different profiles, by using an appropriate diode layout to define two edges.

We claim:
1. A tool-setting gauge comprising means rigidly mountable on a machine-tool frame for projecting an enlarged shadow of a cutting-tool edge profile on to at least least one photoelectric element, said photoelectric element presenting a photosensitive area sufficiently small to be intersectable by only a short length of said enlarged edge profile and being positionable, when partially obscured by the shadow of said profile, to define a datum position of said profile, and means for displaying the output of said photoelectric element relative to a preset output corresponding to the datum position.

2. A gauge as claimed in claim 1 comprising at least two photoelectric elements positionable to define the datum position in two orthogonal directions.

3. A gauge as claimed in claim 1 wherein the means for displaying the output of said photoelectric element relative to a preset output includes a further photoelectric element associated with at least one said element but positioned to be unobscured in operation by said shadow, each pair of associated elements being connected in a bridge circuit presettable to give a predetermined output in the datum position of the profile.

4. A gauge as claimed in claim 3 wherein the means for projecting the enlarged shadow includes a light source and means for modulating the light source, and wherein the output from said bridge circuit is fed to an AC amplifier.

5. A gauge as claimed in claim 4 wherein said modulating means comprises a rotatable disc having its circumference divided by radial slots arranged to interrupt the light from said source.

6. A gauge as claimed in claim 1 wherein said photoelectric element is a photosensitive semiconductor device.

References Cited

UNITED STATES PATENTS

| | | | |
|---|---|---|---|
| 2,125,074 | 7/1938 | Long | 250—202 X |
| 3,013,158 | 12/1961 | McLellan | 250—210 X |
| 3,184,599 | 5/1965 | Benton | 250—202 X |
| 3,155,452 | 11/1964 | Plankeel | 250—202 X |
| 3,348,057 | 10/1967 | Burroughs | 250—210 X |

DAVID J. GALVIN, *Primary Examiner.*

C. R. CAMPBELL, *Assistant Examiner.*